United States Patent [19]

Stenehjem

[11] 4,197,748
[45] Apr. 15, 1980

[54] DISTANCE-MEASURING APPARATUS

[75] Inventor: Willis J. Stenehjem, Billings, Mont.

[73] Assignee: Associated P & C Engineers, Inc., Billings, Mont.

[21] Appl. No.: 909,363

[22] Filed: May 25, 1978

[51] Int. Cl.² .................................................. G01P 3/42
[52] U.S. Cl. ....................................... 73/490; 116/204; 235/92 A; 324/168
[58] Field of Search ......... 73/490; 235/92 A, 92 DN, 235/92 NT; 324/168, 171, 174, 179; 116/204

[56] References Cited

U.S. PATENT DOCUMENTS

| | | | |
|---|---|---|---|
| 2,715,723 | 8/1955 | Webster | 324/168 X |
| 3,187,244 | 6/1965 | Summerer | 73/490 X |
| 3,249,713 | 5/1966 | Briggs | 116/204 |
| 3,719,887 | 3/1973 | Shimizu et al. | 324/171 |
| 3,832,634 | 8/1974 | Galea | 324/174 X |

OTHER PUBLICATIONS

"Rally Milometer" by P. Leah from Practical Electronics, vol. 12, No. 6, pp. 464–469, Jun. 1976.

*Primary Examiner*—Daniel M. Yasich
*Attorney, Agent, or Firm*—Arthur L. Urban

[57] ABSTRACT

Distance-measuring apparatus for attachment to a speedometer cable comprising a sensing assembly and a digital counter; the sensing assembly including a drum portion having a bore therethrough for disposition over an exposed section of the rotatable inner shaft of the speedometer cable, fasteners associated with the drum portion to secure the drum portion to the inner shaft, at least one magnet affixed to the drum portion adjacent a point on the periphery thereof, a housing surrounding the drum portion and spaced therefrom to allow independent rotation of the drum portion therein, fasteners associated with the housing to secure the housing to spaced ends of the sheath of the speedometer cable adjacent to the exposed section of the inner shaft, a magnet-responsive switch affixed adjacent a point on the periphery of the housing; electrical leads connecting the switch with the digital counter; the digital counter being capable of receiving and retaining a preselected constant value and adding the constant value in response to an electrical signal generated by the switch when the magnet passes thereby as the speedometer cable shaft and drum portion affixed thereto are rotated.

7 Claims, 4 Drawing Figures

DISTANCE-MEASURING APPARATUS

This invention relates to a novel apparatus for measuring distances and more particularly relates to a new apparatus for measuring distances using a vehicle.

The measurement of distances for highway construction or repair, for utility pole or line installation and for similar purposes ordinarily involves considerable time and labor. In the past, such measurements were made by two men using a tape. Not only was this method very time-consuming, but also it was subject to human error. If the men did not give their full attention to the measurements they were taking, a length of tape might be omitted from their record.

Various devices have been proposed to facilitate the measurement of distances. One device utilizes a mechanical counter on a wheel which is pushed or pulled over the terrain to be measured. The counter records each revolution of the wheel and multiplying the number of revolutions of the wheel by the circumference of the wheel gives the total distance traveled. While this device allows a single individual to measure distances more quickly than with a tape, it still presents the possibility of human error in the calculations and still requires that the person doing the measurements be exposed to rain, snow and other unfavorable weather conditions.

It also has been proposed to employ measuring devices that can be attached to vehicles so the individual doing the measurements is protected from the weather and so the work can be completed more rapidly. One such device has a sensor to scan targets mounted on one of the wheels of the vehicle. Although this arrangement enables the measurements to be done more quickly, it has a number of drawbacks. For example, since the sensor is mounted adjacent the vehicle wheel, it can be displaced or damaged by contact with rocks, limbs or other debris present on the ground. Also, the targets affixed to the wheel may be dislodged and fall off the wheel. In either situation, realignment of the sensor and/or replacement of the targets are unpleasant chores, especially if they must be done in the field without special tools and equipment.

Another proposed device for measuring distances is designed to be connected directly to the speedometer of a vehicle. This device eliminates the problems associated with wheel targets and sensors, but has other shortcomings. The device employs a meter with a combination of gears which are driven by a length of speedometer cable attached directly to the speedometer with a tee connection. This arrangement requires considerable dexterity on the part of the installer to attach the tee connection under the dash of the vehicle. Also, the cable connecting the speedometer with the meter must be positioned carefully to avoid kinking or squeezing of the cable against other components which would impair the operation of the device. The length and positioning of the cable may restrict the location of the meter for best visibility.

Although devices which are connected to the speedometer can be adapted for use in more than one vehicle, each transfer requires that the meter be recalibrated by replacement of one or more gears in the meter. This necessitates that a supply of different size gears be maintained in inventory. These gears are easily mislaid or lost which can result in delays and the added expense of obtaining replacements.

The present invention provides a novel distance-measuring apparatus which enables measurements to be taken from inside a vehicle. Also, the apparatus of the invention can be installed in a vehicle conveniently. In addition, the distance-measuring apparatus allows the meter portion to be installed in any desired location without restrictions due to cable length or flexibility. Moreover, the apparatus of the invention is simple in design and can be fabricated from commercially available components and materials relatively inexpensively. Furthermore, since the sensing portion of the distance-measuring apparatus is not costly, sensors can be installed in each vehicle with a minimum of expense. Also, the meter portion of the apparatus can be adapted for use in different vehicles quickly and with a minimum of instruction and without the replacement or adjustment of components.

Other benefits and advantages of the novel distance-measuring apparatus of the present invention will be apparent from the following description and the accompanying drawings in which.

Figure 1:
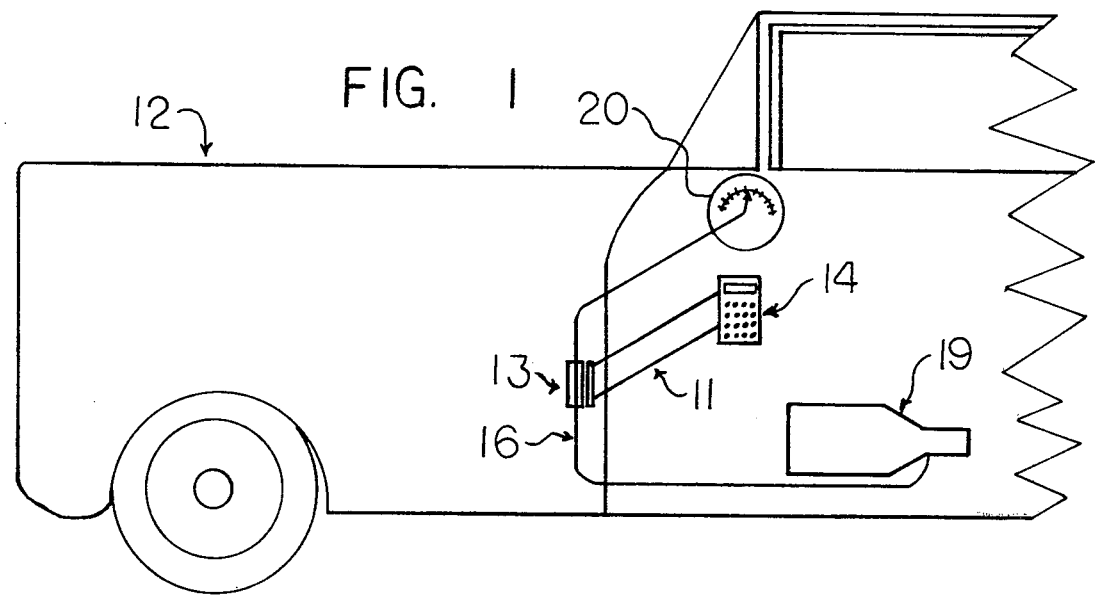
FIG. 1 is a schematic illustration of one form of the distance-measuring apparatus of the invention installed in a vehicle.

As shown in the drawings, one form of the novel distance-measuring apparatus 11 of the invention is installed in a vehicle 12. The distance-measuring apparatus 11 includes a sensing assembly 13 and a digital counter 14. The sensing assembly 13 is attached to a speedometer cable 16 that has a rotatable flexible inner shaft 17 enclosed in a protective sheath 18. Cable 16 connects vehicle transmission 19 with a speedometer 20.

Sensing assembly 13 as shown includes a drum portion 22 with a bore 23 therethrough for disposition over an exposed section of the inner shaft 17. Drum portion 22 is secured with fastening means shown as set screw 24 to the exposed section of the inner shaft 17. One or more magnets 25 are affixed to the drum portion 22 adjacent a point on the periphery of the drum portion. As shown, magnets 25 are positioned in longitudinal passages 26 located just below the surface of the drum portion 22.

Figure 2:
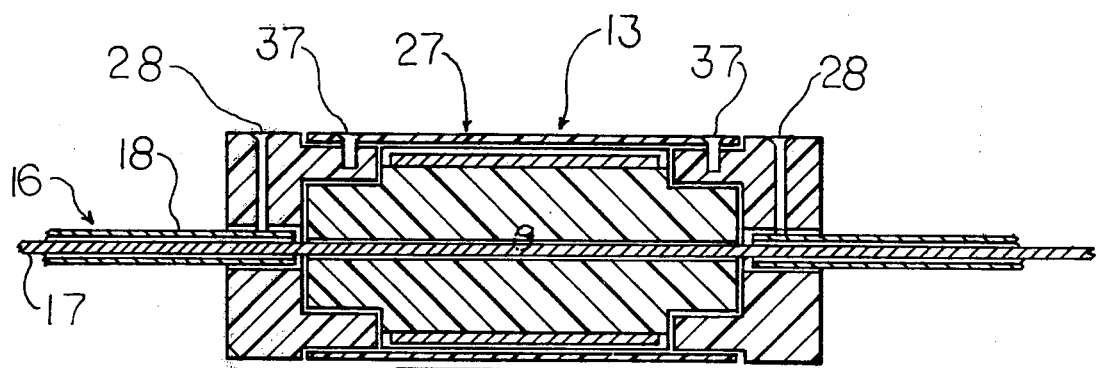
FIG. 2 is an enlarged schematic illustration of the distance-measuring apparatus shown in FIG. 1.
Figure 2:
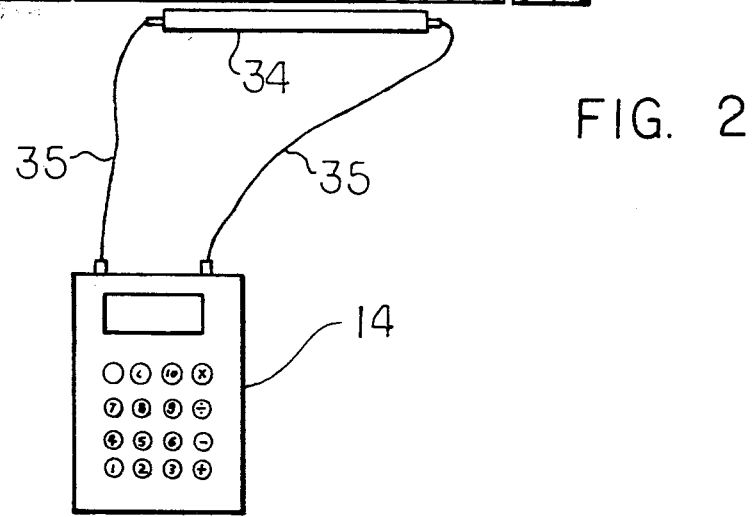
Figure 3:
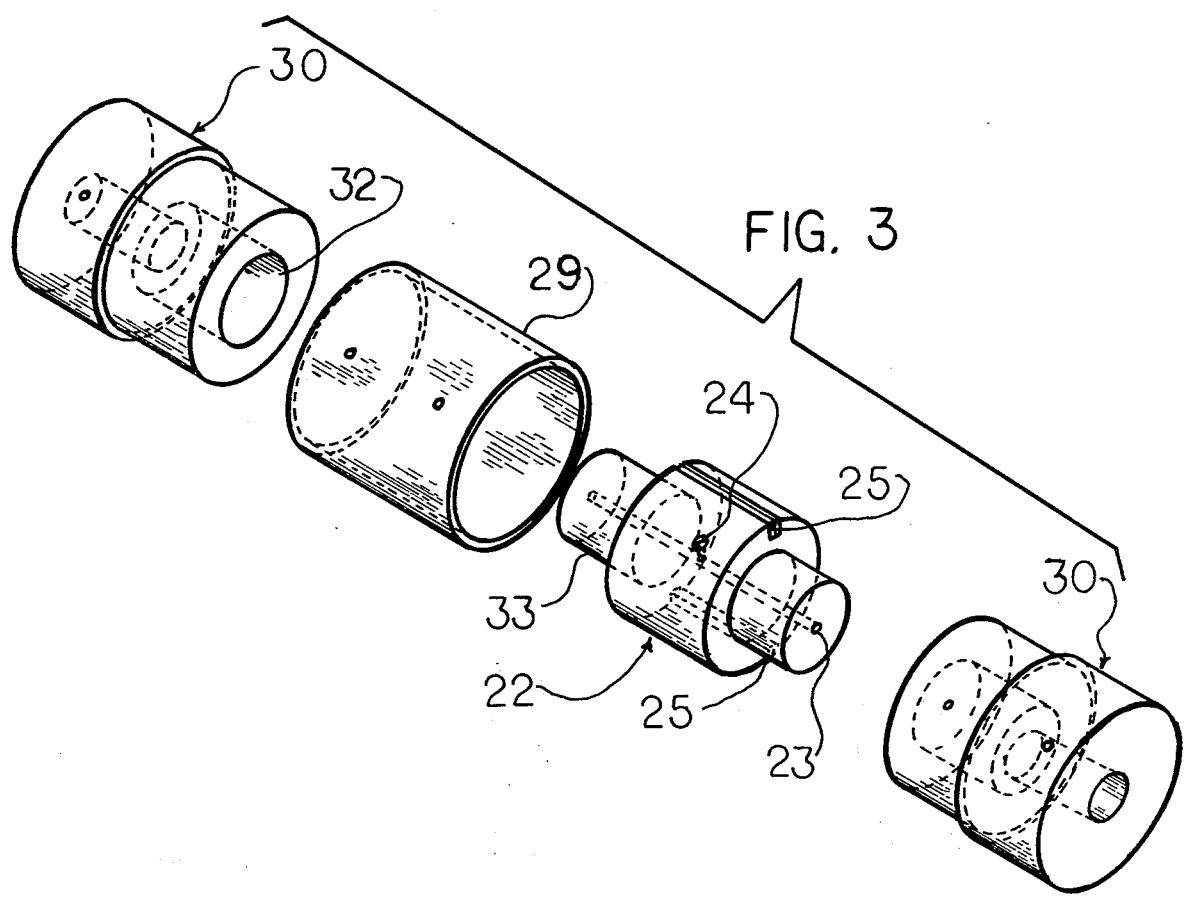
FIG. 3 is a view in perspective with parts separated of the sensing assembly portion of the distance-measuring apparatus shown in FIG. 2.
Figure 4:
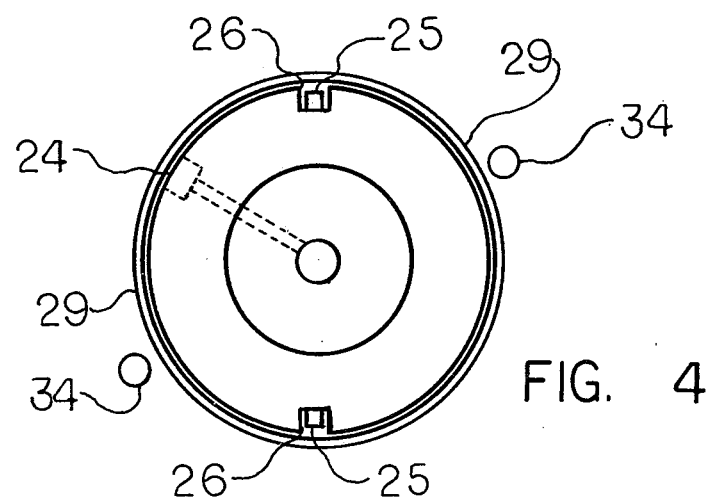
FIG. 4 is an end view of the drum portion of the sensing assembly shown in FIG. 3.

A housing 27 surrounds drum portion 22 and is spaced therefrom to allow independent rotation of the drum portion therein. Housing 27 is secured with fastening means such as set screws 28 to the ends of the cable sheath 18 which are adjacent to the exposed section of inner cable shaft 17 on which drum portion 22 is secured. As shown in FIGS. 2 and 3, housing 27 advantageously includes a barrel portion 29 and separate end portions 30 attached thereto. Preferably, end portions 30 have enlarged internal openings 32 to receive reduced diameter end sections 33 of drum portion 22. Housing 27 and drum portion 22 advantageously are formed of a non-conductive material and particularly a plastic material.

A magnet-responsive switch 34 is affixed adjacent a point on the periphery of housing 27. Preferably, switch 34 is a relay and in particular a reed relay which is secured to the outer surface of housing 27 at a point overlying the position of magnets 25 of drum portion 22.

Switch 34 is connected electrically with digital counter 14 through appropriate electrical leads 35. The flexibility and simplicity of threading the leads 35 from the switch 34 affixed to sensing assembly 13 to the digital counter 14 permits the counter to be located at any spot within or on a vehicle that is convenient for the individual doing the measurement.

Digital counter 14 employed in the distance-measuring apparatus of the invention has the capability of receiving and retaining a preselected constant value. Also, digital counter 14 has the capability of adding the retained constant value in response to an electrical signal generated by switch 34. Digital counter 14 may be a calculator of the type which is commercially available under a number of tradenames. One suitable model is Unisonic 1040 sold by Unisonic Products Corporation of New York, N.Y.

The distance-measuring apparatus of the present invention may be installed in a vehicle by disconnecting the speedometer cable 16 from the transmission 19 and withdrawing the flexible inner cable shaft 17 from the sheath 18. Next, a portion of the sheath 18 is cut out to allow drum portion 22 to be affixed to an exposed section of the inner shaft 17. One of the end portions 30 of housing 27 then is placed over one end of the sheath 18 and secured thereto with a set screw 28 when properly aligned.

Thereafter, the inner cable shaft 17 is reinserted into the section of the sheath 18 on which end portion 30 has been affixed. Drum portion 22 then is threaded over shaft 17 until it is adjacent end portion 30. Set screw 24 in drum portion 22 is tightened to secure the drum portion to the shaft 17. Barrel portion 29 is slipped over shaft 17 into position over drum portion 22 and into engagement with end portion 30. The other end portion 30 then is connected to the other cut end of the sheath 18 and the combination slid along shaft 17 until the second end portion 30 engages the free end of barrel portion 29. Set screws 37 are used to secure the end portions 30 to the barrel portion 29 and complete the assembly. Switch 34 is affixed to the periphery of barrel portion 29 and leads 35 connected to the switch. The speedometer cable 16 with the sensing assembly 13 mounted thereon finally is reconnected to the transmission 19 and the speedometer 20. The digital counter 14 is positioned at a convenient spot for observation and connected to leads 35 to complete the installation.

In using the distance-measuring apparatus shown in the drawings, a constant value equal to the distance traveled by the vehicle for each rotation of the inner cable shaft 17 is punched into the calculator and retained therein. For example, for a 1978 Chevrolet Malibu this constant value is 5.159 feet, 0.0009839 miles or 1.572 meters. As the vehicle moves forward, the pulse or signal generated by the rotation of magnets 25 past switch 34 triggers the counter 14 which records the constant value each time a signal is received. The digital counter 14 displays the total distance traveled so the individual can observe the total by a simple glance at the counter. By pressing the appropriate button, the counter can be cleared and a new measurement taken.

The above description and the accompanying drawings show that the present invention provides a novel distance-measuring apparatus which allows measurements to be taken from inside a vehicle. Furthermore, the meter portion of the apparatus of the invention can be adapted for use in different vehicles very quickly and without replacing or adjusting components of the system. Also, the distance-measuring apparatus can be installed in a vehicle simply and conveniently. In addition, the design of the apparatus permits the display portion to be placed in any desired location without restriction because of cable length or flexibility.

Moreover, the sensing assembly of the distance-measuring apparatus of the invention is positioned in a protected location where it is not susceptible to contact with the elements or debris which might impair its operation or otherwise damage the assembly. Further, since the sensing assembly can be installed conveniently and is relatively inexpensive, sensing assemblies can be installed in each vehicle and the digital counters moved from one vehicle to another as required. The simplicity of adapting the counter to a particular vehicle makes this method of operation especially feasible. In addition, the apparatus of the invention is simple in design and can be fabricated from commercially available components and materials using conventional manufacturing techniques.

It will be apparent that various modifications can be made in the particular distance-measuring apparatus described in detail above and shown in the drawings within the scope of the invention. For example, the size and configuration of the various components can be changed to meet specific requirements. Also, the number of magnets and/or switches can be varied as desired. Therefore, the scope of the invention is to be limited only by the following claims.

What is claimed is:

1. Distance-measuring apparatus for attachment to a speedometer cable having rotatable flexible inner shaft and an outer sheath, said distance-measuring apparatus comprising a sensing assembly and a digital counter; said sensing assembly including a drum portion having reduced end portions and a bore therethrough for disposition over an exposed section of said rotatable inner shaft of said speedometer cable, fastening means associated with said drum portion to secure said drum portion to said inner shaft, at least one magnet affixed to said drum portion in a predetermined position adjacent a point on the periphery thereof, a housing surrounding said drum portion formed of a plurality of sections comprising separate end sections and a barrel portion, said housing being spaced from said drum to allow independent rotation of said drum portion therein, each of said reduced end portions fitted in one of said housing end sections, separate fastening means securing said barrel portion to each of said end sections of said housing and to spaced ends of said cable sheath of said speedometer cable adjacent to the exposed section of said inner shaft, a magnet-responsive switch affixed adjacent a point on the periphery of said housing; electrical leads connecting said switch with said digital counter; said digital counter being capable of receiving and retaining a preselected constant value and adding said constant value in response to an electrical signal generated by said switch when said magnet passes thereby as said speedometer cable shaft and drum portion affixed thereto are rotated.

2. Distance-measuring apparatus according to claim 1 wherein said magnet-responsive switch is a reed relay.

3. Distance-measuring apparatus according to claim 1 wherein said drum portion and said housing are formed of a non-conductive material.

4. Distance-measuring apparatus according to claim 1 wherein said drum portion and said housing are formed of a plastic material.

5. Distance-measuring apparatus according to claim 1 wherein said fastening means for said drum portion and said housing are set screws.

6. Distance-measuring apparatus according to claim 1 wherein a plurality of switches are affixed equidistantly about the periphery of said housing.

7. Distance-measuring apparatus according to claim 1 wherein said magnets are affixed equidistantly about the periphery of said drum portion.

* * * * *